May 23, 1967   O. J. GAGNE   3,320,790
STRUCTURE FOR AIDING COMPASS COMPENSATION
Filed Feb. 1, 1965   3 Sheets-Sheet 1

INVENTOR.
OSCAR JAMES GAGNE
BY *Whittemore,*
*Hulbert & Belknap*
ATTORNEYS

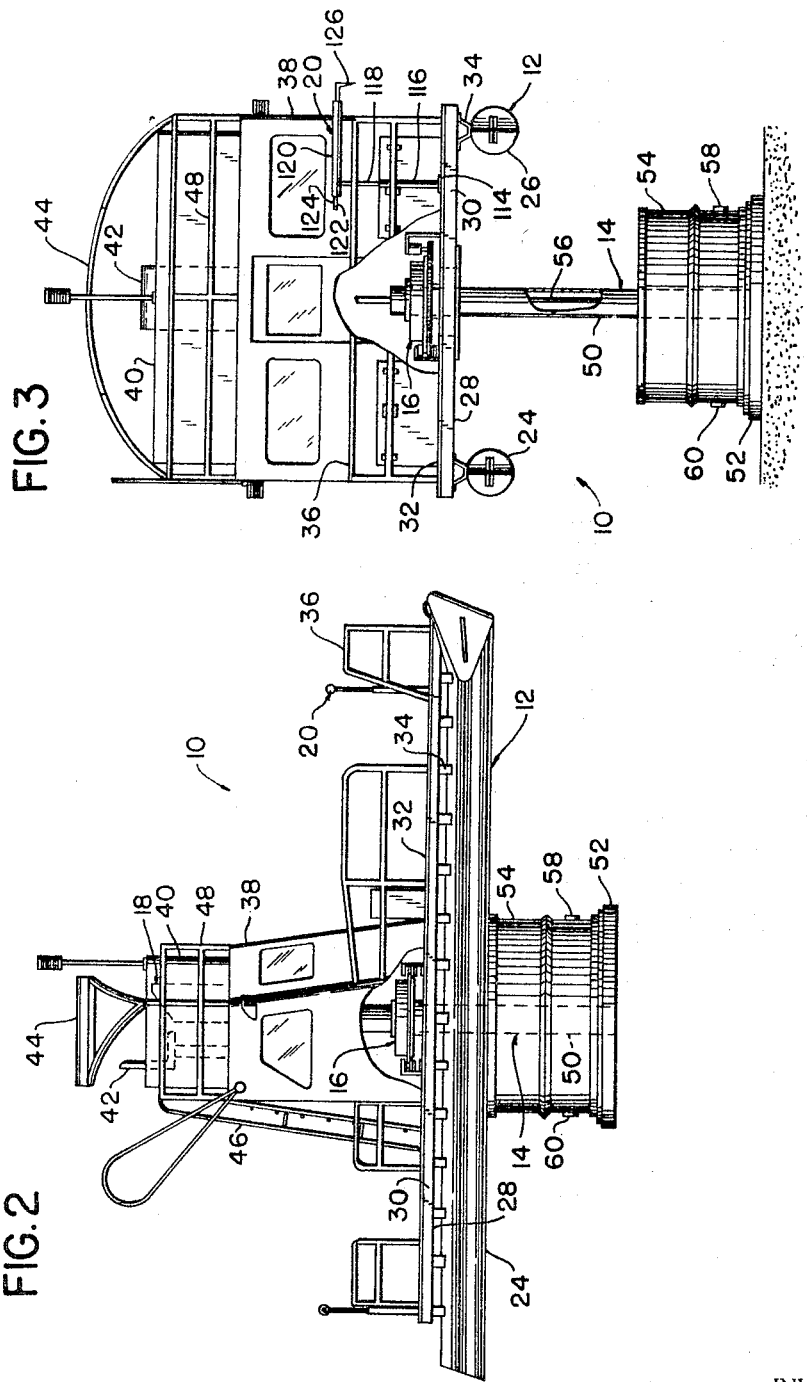

May 23, 1967   O. J. GAGNE   3,320,790
STRUCTURE FOR AIDING COMPASS COMPENSATION
Filed Feb. 1, 1965                                   3 Sheets-Sheet 3
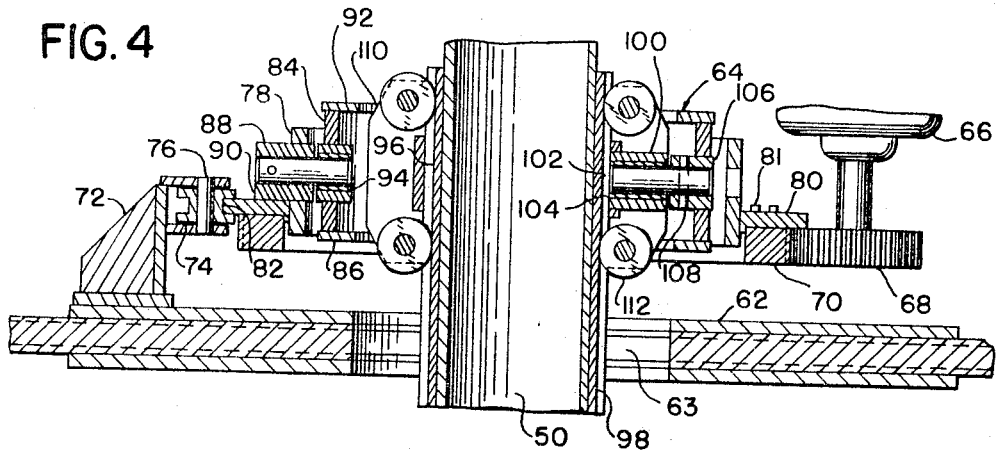
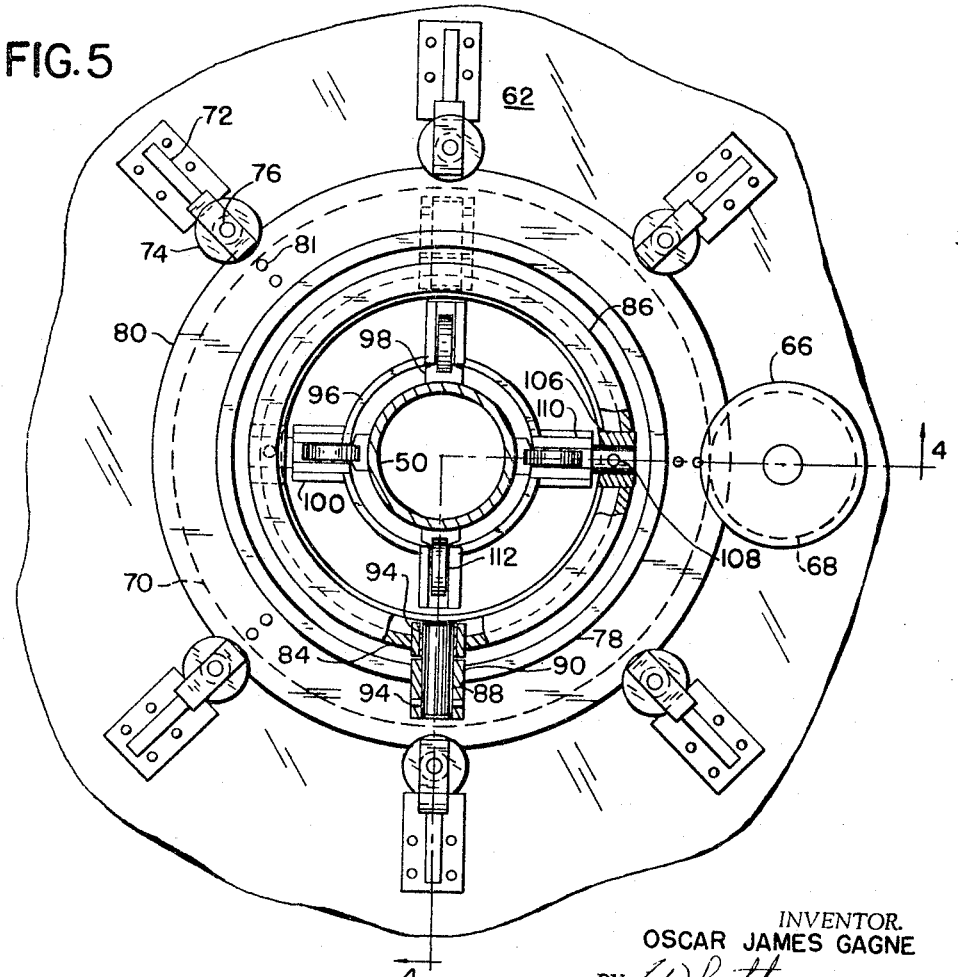
INVENTOR.
OSCAR JAMES GAGNE
BY *Whittemore,*
*Hulbert & Belknap*
ATTORNEYS

United States Patent Office 3,320,790
Patented May 23, 1967

3,320,790
STRUCTURE FOR AIDING COMPASS
COMPENSATION
Oscar James Gagne, 90 N. Deeplands,
Grosse Pointe, Mich. 48236
Filed Feb. 1, 1965, Ser. No. 429,263
9 Claims. (Cl. 73—1)

The invention relates to boats and refers more specifically to means for and a method of orienting a boat and verifying the readings of a compass installed in the boat during compass compensation and the like.

Magnetic compasses installed on boats or the like require compensation in order that they may correctly indicate direction with the boat in different orientations. This is particularly true if the boat on which the compass is installed includes large metal objects, such as motors. Thus a metal object, such as a motor which may be polarized magnetically, will affect a magnetic boat compass located within the magnetic field thereof differently with the boat and therefore the motor oriented in different directions with respect to the magnetized needle of the magnetic compass.

In the past compensation of magnetic boat compasses has been accomplished primarily by running the boat in a known direction and placing compensating devices, such as small magnets, about the compass until the compass indicates that the boat is travelling in the direction to which it is known to be travelling. This procedure must be repeated several times with the boat travelling in different directions before the usual compass compensation is completed. Such procedure is obviously time consuming and requires extensive operation of the boat on a relatively large body of water.

In addition, it is desirable to periodically verify the accuracy of a magnetic compass since the compensation thereof may change with the changing of the strength of the compensating magnets or the addition of equipment to the boat and/or greater or less polarization of the existing equipment.

It is therefore one of the objects of the present invention to provide an improved method of orienting a boat or similar structure and verifying readings of a magnetic compass positioned thereon for compass compensation or the like.

Another object is to provide improved structure for orienting a boat or similar structure and verifying readings of a magnetic compass positioned thereon during compass compensation or the like.

Another object is to provide a method of verifying the readings of a magnetic compass positioned on a boat comprising securing the boat to boat orienting structure in longitudinal alignment with the boat orienting structure, rotating the boat orienting structure and boat into alignment with desired directions and checking the reading of the magnetic compass on the boat with the boat oriented in the desired directions against the reading of a gyrocompass located on the boat orienting structure.

Another object is to provide structure for orienting a boat and verifying the readings of a magnetic compass located on the boat comprising a floating platform, a gyrocompass positioned on the floating platform, means for securing a boat to the floating platform in longitudinal alignment therewith and means for rotating the floating platform and boat secured thereto to orient the boat as desired.

Another object is to provide structure as set forth above wherein the means for rotating the floating platform comprises an anchor shaft positioned centrally of the platform, an anchor secured to said shaft for anchoring the platform in a predetermined location and gear and pinion means operable between the platform and shaft for rotating the platform around the shaft.

Another object is to provide structure as set forth above and further including means for raising the shaft and anchor to permit movement of the floating platform to selected locations.

Another object is to provide structure as set forth above and further including a universal connection between the shaft and floating platform to permit movement of the platform with respect to the anchor shaft to allow for waves and the like.

Another object is to provide structure as set forth above wherein the means for securing a boat to the floating platform in longitudinal alignment therewith includes a pair of graduated telescoping arms positioned on the floating platform adapted to be extended over a boat positioned alongside of the floating platform having pointers thereon for indicating the center line of the boat.

Another object is to provide a method of and means for orienting a boat and verifying readings of a magnetic boat compass thereon which is simple, economical and efficient.

Other objects and features of the invention will become apparent as the description proceeds, especially when taken in conjunction with the accompanying drawings, illustrating a preferred embodiment of the invention, wherein:

FIGURE 2 is a partially broken away elevation view of the structure illustrated in FIGURE 1 showing the anchor in raised positions.

FIGURE 3 is a partially broken away front view of the structure illustrated in FIGURE 1 taken in the direction of arrow 3 in FIGURE 2.

FIGURE 4 is an enlarged section view of the universal anchor shaft guiding structure of the structure illustrated in FIGURES 1–3 taken substantially on the line 4—4 in FIGURE 5.

FIGURE 5 is a partially broken away plan view of the universal anchor shaft guiding structure illustrated in FIGURE 4.

Figure 1:
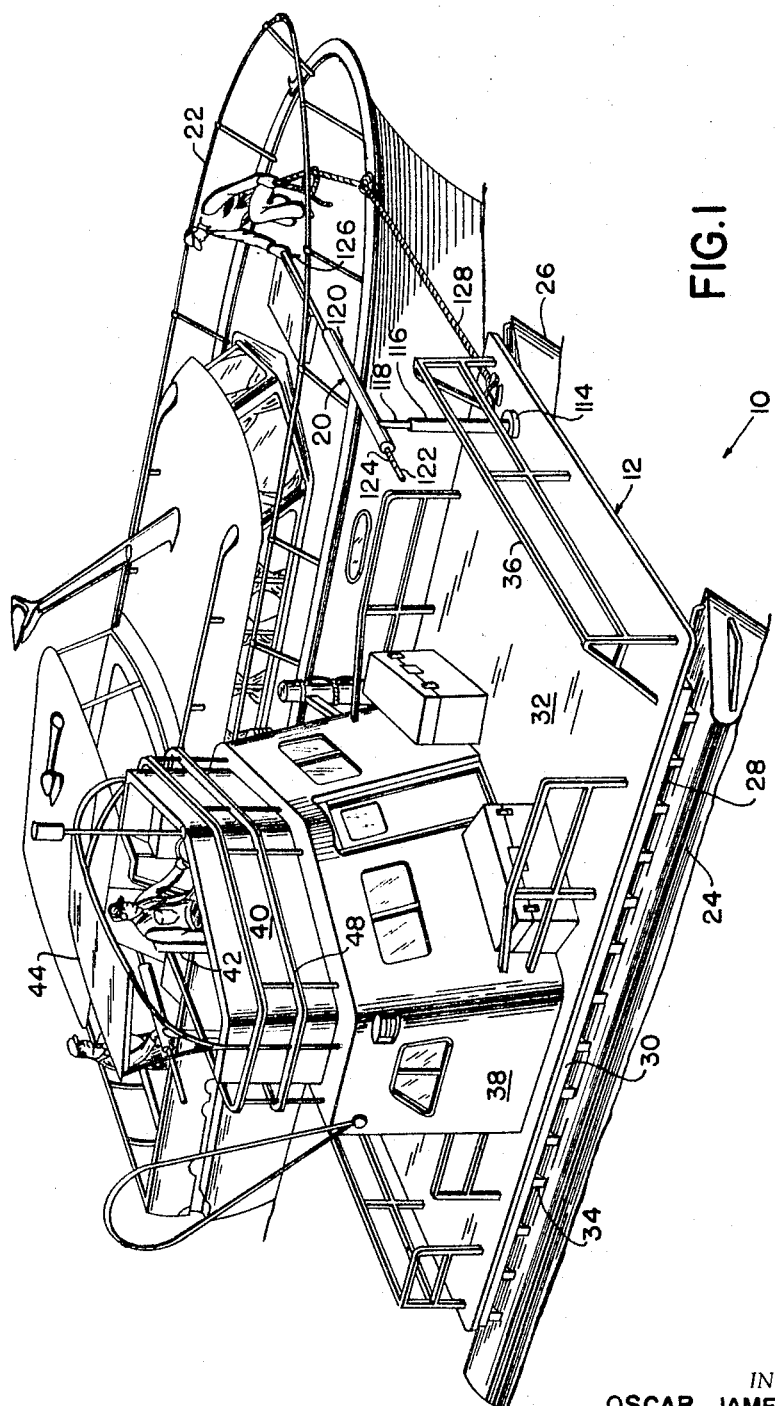
FIGURE 1 is a perspective view of the boat orienting and compass reading verifying structure of the invention in use.

With particular reference to the figures of the drawings, one embodiment of the present invention will now be considered in detail.

As shown in the figures, the structure 10 for orienting a boat and verifying the readings of a compass installed thereon comprises the floating platform 12, anchor structure 14 for maintaining the floating platform 12 in variably predetermined locations, means 16 for rotating the platform 12 about the anchor structure 14, and a gyrocompass 18 secured to the floating platform 12. The structure 10 further includes the telescoping arms 20 for aligning the boat to be oriented with the longitudinal axis of the floating platform 12 while the boat is secured to the platform.

In operation the structure 10 is moved to a location in which it is desired to orient boats to permit verifying of the readings of magnetic compasses thereon with the anchoring structure in a raised position, as shown in FIGURE 2. The anchoring structure 14 is then lowered to fix the location of the structure 10. A boat 22 which it is desired to orient in different directions for purposes of verifying the readings of a magnetic compass thereon or compensating the magnetic compass or the like is then secured to the boat structure 10 in alignment with the floating platform 12 with the aid of the telescoping arms 20. The structure 10 is then rotated about the anchoring structure 14 to point the boat in any desired direction without the necessity of operating the boat and the readings of the magnetic compass on the boat are compared with the readings of the gyrocompass 18 on the structure 10.

More specifically the floating platform 12 of the structure 10 includes a pair of floats 24 and 26 extending longitudinally thereof at the opposite sides thereof which may be constructed of metal or suitable plastic so as to provide the buoyancy necessary to support the structure 10. A deck 28 which may include the transversely supporting members 30 and deck members 32 is supported on the floats 24 and 26 by means of suitable brackets 34.

A railing 36 extends around the outer periphery of the deck 28 while the deck house 38 is supported on deck 28. The gyrocompass 18, which it will be recognized is not magnetic is mounted on the top of the deck house 38 together with bridge structure 40 including bridge chair 42 and bridge cover 44. A ship's ladder 46 extends between the deck 28 and the bridge structure 40 and connects to the rail 48 surrounding the bridge structure 40.

The anchor structure 14, as illustrated best in FIGURES 2 and 3, includes the vertically movable hollow anchor shaft 50 secured at the bottom to the anchor 52 which may be of concrete for example, and the hollow tank 54 which may be of metal and which is sealed to permit pressurization thereof secured to the anchor 52 about the shaft 50. The shaft 50 is guided in axial reciprocation through the universal structure 16 as will be considered subsequently. The tank 54 may be pressurized by convenient means, such as for example a feed pipe 56 extending through the hollow shaft 50 and suitable valve structure 58 and 60 in the tank 54.

The weight of the anchor 52 combined with the anchor shaft 14 is such that with the tank 54 empty, the anchor and shaft are biased by gravity in a downward direction, while with the tank 54 filled with air, the anchor 52 and anchor shaft 50 are biased in an upward direction.

The structure 16 for rotating the floating platform 12 about the anchor shaft 14 includes an annular reinforcing discs 62 positioned on both sides of an opening 63 in the deck 28, the universal structure 64, motor 66 and the pinion 68 driven by motor 66 and engaged with the gear 70 carried by the universal structure 64. On energization of the motor 66, the pinion 68 is rotated to rotate the floating platform 12 about the anchor shaft 50 since the universal structure 64 is secured in a fixed angular position with respect to the shaft 50 and the gear 70 meshed with the pinion 68 is secured to the universal structure 64.

The universal structure 64 for guiding the anchor shaft 50 in its axial movement includes a plurality of stationary brackets 72 secured to the upper annular disc 62 angularly about the periphery thereof. Horizontally mounted rollers 74 are secured to the brackets 72 for rotation with respect thereto about the roller mounting pins 76.

An outer annular ring 78 is supported in the rollers 74 for rotation about the axis of generation of the rings 78 by the annular disc 80 the outer periphery of which is positioned within the groove 82 of the rollers 74. The inner periphery of the disc 80 is secured to the outer cylindrical ring 78 by convenient means, such as welding. The gear 70 is secured to the bottom of the disc 80 in mesh with the pinion 68 by convenient means such as bolts 81.

A central cylindrical ring 84 reinforced by annular discs 86 at the top and bottom thereof is positioned within the outer ring 78 and is concentric therewith. The ring 84 is pivotally secured to the ring 78 by means of the pivot pins 88 displaced one hundred and eighty degrees about the rings 78 and 84 and secured in the cylindrical bushings 90 which are secured to the disc 80 and extend through the ring 78. The pins 88 are piovtally mounted in the sleeves 92 having bearing bushings 94 therein extending through the ring 84. Thus, ring 84 may be rotated about the axis of the pins 88 extending through the rings 78 and 84.

The universal structure 64 further includes a third cylindrical ring 96 positioned within and concentric to the ring 84 and closely surrounding the track members 98 secured longitudinally of the anchor shaft 50. A sleeve 100 rigidly secured to the ring 96 extends radially outwardly thereof and supports a pivot pin 102 within a bearing 104 on opposite sides of the anchor shaft 50 at two positions displaced ninety degrees with respect to the positions of the pins 88, as shown best in FIGURE 5. Pins 102 are rigidly secured to the ring 84 by means of the sleeves 106 extending therethrough and pins 108. Thus, ring 96 may be rotated about the axis of the pins 102 which is perpendicular to the axis of the pins 88.

Brackets 110 are secured to ring 96. The brackets 110 support rollers 112 engaged in the tracks 98 on the anchor shaft 50.

Thus, in operation, the anchor shaft 50 is permitted to reciprocate axially with the rollers 112 traveling along the tracks 98. In adition, the floating platform 12 is permitted to assume various angles of inclination with respect to the shaft 50 due to the action of waves and the like on the floats 24 and 26 without disturbing the shaft 50 passing through the opening 63 in the deck 28 due to the universal pivoting of the platform 12 with respect to the anchor shaft 50 provided by the universal structure 64.

The telescoping arm structure 20 is provided at each end of the deck 28 and may, if desired, be positioned on both sides thereof. As shown in FIGURE 1, the telescoping arm structure 20 includes a base 114, a hollow shaft 116 including the telescoping shaft 118 therein which permits vertical adjustment of the hollow arm 120. An aligning rod 122 extends through the hollow arm 120. If desired the aligning rod 122 may have calibrations 124 thereon used to exactly center a boat 22 with respect to the longitudinal axis of the structure 10 by placing the indicating members 126 secured to the measuring rods 24 over the center line of the boat at both the front and rear of the structure 10.

In over-all operation, the structure 10 may be anchored at a convenient location adjacent, for example, a boat marina with the tank 54 filled with water and the anchor 52 which may have stakes in the bottom thereof if desired, firmly anchored in the bottom of the body of water on which the structure 10 floats. A boat is then secured to the side of the structure 10 by convenient means, such as ropes 128, with the aid of the telescoping arms 20 so that the longitudinal axis of the boat 22 and that of the structure 10 are in alignment.

The motor 66 is then energized by convenient means (not shown) to produce rotation of the floating platform 12 about the anchor shaft 50 along with the boat 22 secured thereto. The readings of the magnetic compass mounted on the boat 22 are then compared with the readings of the gyrocompass 18 on the structure 10 to verify the compass readings, calibrate the compass or the like. Extensive operation of the boat in calibrating a compass and verifying compass readings is therefore no longer necessary.

When it is desired to move the structure 10 to a new location, it is only necessary to fill the tank 54 with air through the air supply line 56 from a source of compressed air (not shown) but which may be, for example, a compressor located in the deck house 38 to cause the anchor 52 to raise into the position illustrated in FIGURE 2 whereby the structure 10 may be driven to a new location by convenient means, such as an outboard motor (not shown) secured to the rear of the deck 28.

While one embodiment of the present invention has been considered in detail, it will be understood that other embodiments and modifications thereof are contemplated. It is the intention to include all embodiments and modi-

What I claim as my invention is:

1. Structure for orienting a boat or similar structure having a magnetic compass mounted thereon and verifying readings of the magnetic compass for compass compensating or the like comprising a floating platform, a gyrocompass positioned on the floating platform, means for securing a boat to the floating platform in predetermined alignment therewith and means for rotating the floating platform and a boat secured thereto into alignment with predetermined directions.

2. Structure as set forth in claim 1 wherein the means for rotating the floating platform comprises an anchor, an anchor shaft secured to the anchor and extending through the floating platform and means operable between the floating platform and anchor shaft for rotating the floating platform about said anchor shaft.

3. Structure as set forth in claim 2 and further including means secured to the anchor and anchor shaft for raising and lowering the anchor and anchor shaft with respect to the floating platform.

4. Structure as set forth in claim 2 and further including universal structure positioned between the floating platform and anchor shaft for permitting universal movement between the floating platform and anchor shaft.

5. Structure as set forth in claim 1 wherein the means for securing a boat to the floating platform in alignment therewith includes telescoping arms secured to the floating platform in predetermined positions thereon and having pointers secured thereto movable over a boat secured to the floating platform for indicating the center line thereof during securing of the boat to the floating platform.

6. Structure for orienting a boat having a magnetic compass thereon and verifying the readings of the magnetic compass comprising a floating platform including a pair of elongated buoyant members and a deck secured to the elongated buoyant members at the sides thereof, a gyrocompass positioned centrally of the floating platform, anchor structure extending through said floating platform, universal structure operable between said anchor structure and floating platform and means connected to said floating platform for rotating said floating platform about said anchor structure and means for securing a boat to said floating platform for rotation about the anchor structure in longitudinal alignment with the floating platform.

7. Structure as set forth in claim 6 wherein the anchor structure comprises an anchor, an anchor shaft secured to the anchor and extending through said universal structure and a tank secured to the anchor shaft and anchor so related in size to said anchor and anchor shaft as to provide buoyancy sufficient to lift said anchor structure on being filled with air.

8. Structure as set forth in claim 6 including guide tracks on said anchor shaft and wherein said universal structure includes an outer cylindrical ring supported for horizontal rotation concentric with said anchor shaft in a fixed position relative to said floating platform, a center ring within said outer ring and concentric therewith and a pivotal joint between the outer and center ring operable to permit relative roation of the center ring with respect to the outer ring about a horizontal axis, and inner cylindrical ring concentric with and closely surrounding said anchor shaft and guide tracks, pivot means securing said inner cylindrical ring to said center cylindrical ring for pivotal movement about a horizontal axis at right angles to said first horizontal axis and rollers carried by said inner cylindrical ring in engagement with said tracks on said anchor shaft for guiding the movement of said anchor shaft.

9. The method of verifying the reading of a magnetic compass on a boat comprising securing the boat to a floating platform, rotating the boat and platform into alignment with predetermined directions and checking the magnetic compass readings with the boat aligned in the different directions with the readings of a gyrocompass positioned on said floating platform.

References Cited by the Examiner

UNITED STATES PATENTS 3,120,106  2/1964  Foster _____ 114—230

FOREIGN PATENTS 292,878  5/1917  Germany.

LOUIS R. PRINCE, *Primary Examiner.*

S. C. SWISHER, *Assistant Examiner.*